United States Patent Office 3,008,690
Patented Nov. 14, 1961

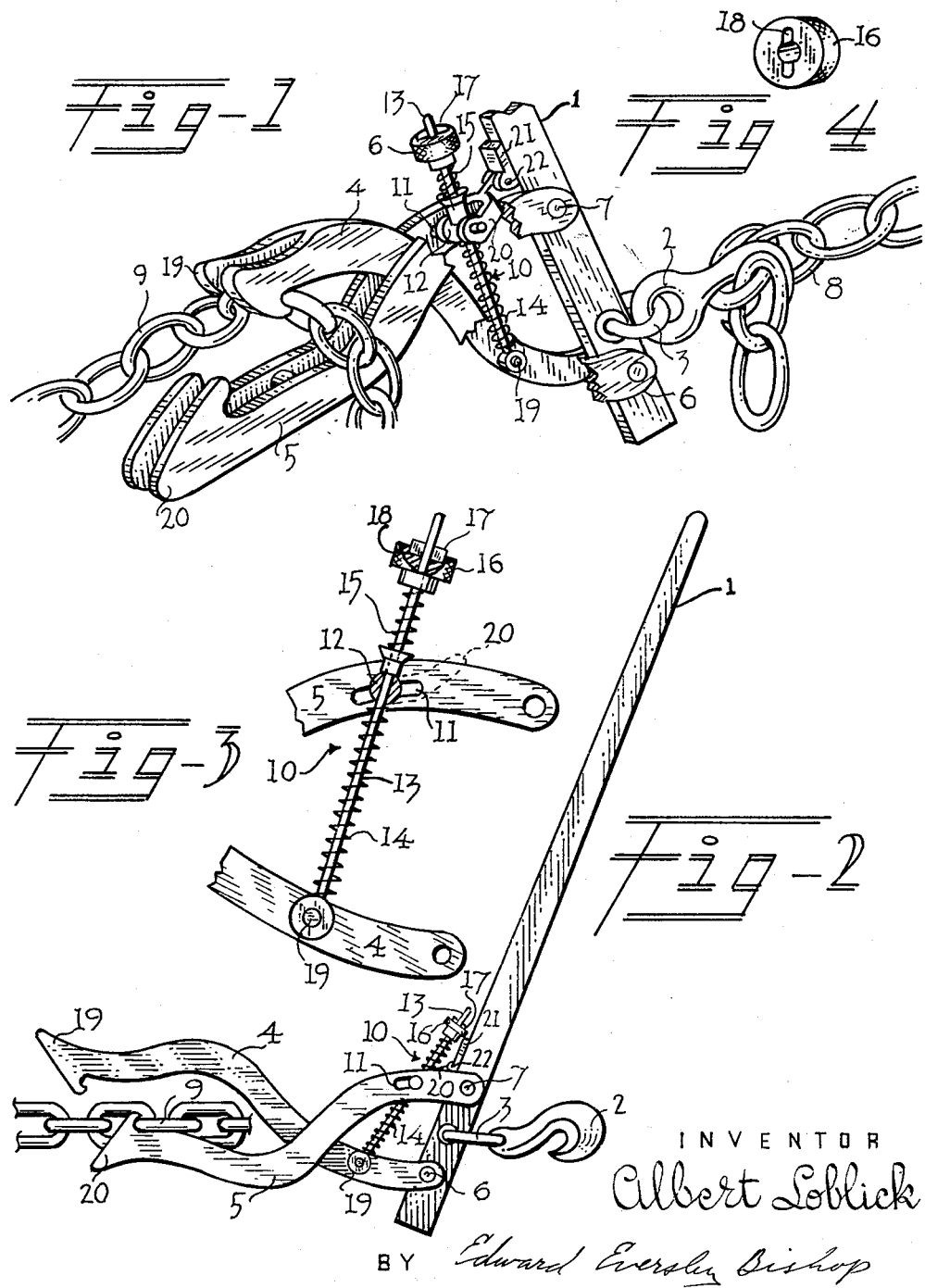

3,008,690
CHAIN CRAWLERS
Albert Loblick, Gibbons, Alberta, Canada
Filed Mar. 14, 1960, Ser. No. 14,974
2 Claims. (Cl. 254—75)

This device relates to improvements in mechanical lifting aids of the chain crawler type.

Chain crawlers of the type comprising a lever with crossed or interlaced claw arms that are engageable on a chain, are now well known. Generally, apparatus of this type comprises a lever that may be moved or oscillated back and forth to alternately engage and disengage claw arms with the links of a chain. In such apparatus, there is generally a reversing mechanism that reacts between the moving claw arms to adjust the movement of the arms and cause the apparatus to move up or down the chain as desired.

The principal object of this present device is to provide an improved reversing mechanism whose use will ensure positive operation of the claw arms in either direction on the chain at all times.

An additional object is to provide an improved reversing mechanism that uses interacting springs for its improved operation.

Numerous other objects and advantages of my improved reversing mechanism will be obvious from a reading of the following specification in conjunction with the attached drawings. Obviously, various changes and modifications as fall within the scope of the appended claims may be made without departing from the inventive spirit and scope thereof.

In the drawings:

FIGURE 1 is a projected side view of my improved apparatus partly broken away and with one arm engaging a chain link.

FIGURE 2 is a side elevation showing my apparatus with the alternate claw engaged with the chain.

FIGURE 3 is an enlarged detail view of my reversing trigger.

FIGURE 4 is an isometric view of the adjusting nut.

The chain crawler used in my device comprises the lever arm 1 which has a hook 2 attached pivotally to the arm at 3 and extending on one side of the arm for attachment to a chain 8 or the like. The claw 4 with claws 19 and the claw arm 5 with claws 20 are crossed or interlaced as indicated and the arm 4 is connected pivotally at 6 to the lever 1 while the arm 5 is connected pivotally thereto at 7. It should be noted that the pivotal connections 6 and 7 are located on the lever 1 on opposite sides of the pivotal connection 3 of the hook, 2, so the lever 1 may be moved backwardly and forwardly about the hook 2. In operation, a chain 9 is connected to either the claw on the arm 4 or the arm 5 and thereafter as the lever 1 is moved backwardly and forwardly, the claw arms 4 and 5 will alternately engage and disengage with the links on the chain 9.

The controlling mechanism referred to generally by the numeral 10 is provided to control movement of the claw arms 4 and 5 in either direction along the chain 9 and this control mechanism includes the slots 11 formed in the claw arm 5 and the axle 12 which is mounted freely in these slots 11. The axle 12 is connected to the lever arm 1 by the link 20 which is connected rotatably at its one end to the axle 12 and at its opposite end 22 to the block 21 which is secured to the lever 1. The rod 13 connected pivotally at 19 to the claw arm 4 extends slidably through the axle 12 to project at its opposite end beyond the axle and a compression spring 14 encircling the rod 13 co-acts between the axle 12 and the claw arm 4. A second spring 15 encircles the rod 13 beyond the axle 12 and co-acts between the axle 12 and the adjusting nut 16 at the opposite end of the rod 13.

The adjusting nut 16 is mounted slidably on the rod 13 and is contained thereon by the pin 17 which extends through the rod 13 to engage on the nut and hold the nut in the position illustrated in FIGURE 3. To adjust the apparatus for reverse movement, it is only necessary to partially rotate the adjusting nut 16 so that the pin 17 will fit into the depressions 18 in the nut 16. This will decrease the compression of the spring 15 with relation to the spring 14 and allow the spring 14 to act on the arms 4 and 5 and urge the claws inwardly toward the chain. The crawler will move in a forward or, as shown in the drawings, a right to left direction along the chain 9. When the nut 16 is adjusted so that the pin 17 is out of the depressions 18, the compression on the spring 15 will be increased and the spring 15 will then control the arms 4 and 5 to urge the arms away from the chain and the crawler will then move in the reverse or left to right direction along the chain.

With the claw 19 engaged in a link of the chain 9, the lever 1 is moved forwardly toward the chain 9. This will move the claw arm 5 ahead until the claws 20 are engaged with a link on the chain thereafter movement of the lever 1 backwardly will move the arm 4 ahead to engage the claw 19 with a link. Thereafter, movement of the lever backwardly and forwardly will cause alternate engagement and disengagement of the claws 19 and 20 with the chain.

With one of the claws 20 engaged with a link of the chain as shown in FIGURE 2 in the drawings, alternate movement of the lever 1 backwardly and forwardly will move the claw arms 4 and 5 alternately one past the other and since they are now urged away from the chain, the claws 19 and 20 will be moved alternately one behind the other to engage with the links of the chain and the crawler therefore will move in the reverse or left to right direction along the chain.

What I claim as my invention is:

1. In a chain crawler having a lever arm with crossed claw arms each connected pivotally at one end to the lever arm and adapted to alternately engage and disengage at their opposite ends with links along a chain as the lever arm is moved, slots in one of the claw arms, an axle mounted freely in the slots, a link connecting the axle to the lever arm, a rod connected pivotally at one end to the other claw arm and extending slidably through the axle to project at its opposite end beyond the axle, a first spring acting between the axle and the said other claw arm to urge the claws toward the links on a chain, a second spring acting between the axle and the opposite end of the rod to force the claws away from the links on a chain and means to increase and decrease the tension of the second spring with relation to the first spring.

2. The chain crawler as claimed in claim 1 wherein the means to increase and decrease the tension of the second spring comprises a nut mounted slidably on the said rod adjacent the opposite end thereof, a pin extending laterally through the rod, impressions in the nut to receive the pin and allow sliding movement of the nut on the rod.

References Cited in the file of this patent
UNITED STATES PATENTS

| | | |
|---|---|---|
| 912,845 | Haynes et al. | Feb. 16, 1909 |
| 2,497,805 | Towse | Feb. 14, 1950 |